United States Patent
Esser

(10) Patent No.: US 6,240,966 B1
(45) Date of Patent: Jun. 5, 2001

(54) PIPE FOR CONVEYING SOLIDS

(75) Inventor: Alexander Esser, Warstein (DE)

(73) Assignee: Esser-Werke GmbH & Co. KG, Warstein (DE)

( * ) Notice: Subject to any disclaimer, the term of this patent is extended or adjusted under 35 U.S.C. 154(b) by 0 days.

(21) Appl. No.: 09/449,455

(22) Filed: Nov. 25, 1999

(51) Int. Cl.$^7$ .................................................. F16L 9/04
(52) U.S. Cl. ........................ 138/109; 138/177; 138/172; 285/55; 285/416
(58) Field of Search .................................. 138/109, 177, 138/143, 155, 172, 174, 178; 285/55, 286, 416

(56) References Cited

U.S. PATENT DOCUMENTS

| | | | |
|---|---|---|---|
| 4,775,190 | * | 10/1988 | Jacob ............................... 301/124 R |
| 4,947,547 | * | 8/1990 | Matt ..................................... 29/888.1 |
| 5,044,670 | * | 9/1991 | Esser ....................................... 285/16 |
| 5,379,805 | * | 1/1995 | Klemm et al. ........................ 138/109 |
| 5,518,035 | * | 5/1996 | Hoshishima et al. ................ 138/109 |
| 5,813,437 | * | 9/1998 | Esser ..................................... 138/109 |

FOREIGN PATENT DOCUMENTS 3814034    11/1989  (DE) .
196 30 039
   C2     5/1998  (DE) .

* cited by examiner

Primary Examiner—Patrick Brinson
(74) Attorney, Agent, or Firm—Friedrich Kueffner

(57) ABSTRACT

A pipe for conveying solids provided at least at one end thereof with a circumferential radially extending coupling flange and an axially extending annular portion connected to the coupling flange. An annular insert of a material having a greater resistance to wear as compared to the material of the pipe is arranged in a chamber formed by the coupling flange and the annular portion. The coupling flange and the annular portion are formed by a chipless deformation from a tubular steel cylinder.

5 Claims, 1 Drawing Sheet

PIPE FOR CONVEYING SOLIDS

BACKGROUND OF THE INVENTION

1. Field of the Invention

The present invention relates to a pipe for conveying solids provided at least at one end thereof with a circumferential radially extending coupling flange and an axially extending annular portion connected to the coupling flange, wherein an annular insert of a material having a greater resistance to wear as compared to the material of the pipe is arranged in a chamber formed by the coupling flange and the annular portion.

2. Description of the Related Art

Pipes for conveying solids, particularly concrete, are subjected to significant wear because of the abrasive effect of the conveyed medium. Because of turbulence at the radial offsets of two pipes coupled to each other, a wear which is higher than proportional occurs especially at the end at the inlet side of a pipe. The conveyed medium impinges against the end face portions of the pipe arranged downstream in the conveying direction.

Because of this increased wear, the ends of a pipe were provided with inserts of a material having a greater resistance to wear as compared to the pipe material. The purpose was to prevent premature wear of the pipe ends which could have rendered the entire pipe useless. These inserts, for example, in the form of wear rings, usually are of a non-weldable material. Therefore, it was not possible to weld the inserts to the ends of the pipes. For this reason, chambers were provided at the ends of the pipes in which the inserts were secured in their position.

DE 38 14 034 A1 discloses a curved cast pipe as a component of a pipe line for conveying solids in which inner wear inserts are provided at the ends of the cast pipe extending in radial planes of the radial flanges. The wear inserts can be pressed into corresponding recesses of the curved cast pipe or may be exchangeably mounted in these recesses. The manufacture of these recesses is comparatively simple in cast pipes because they can already be taken into consideration when the pipe is cast.

For reasons of weight, elongated pipes are usually not manufactured of cast iron, but of steel. Cylindrical steel pipes are manufactured essentially endless and are then cut to length as required for the specific application and are provided at the ends thereof with coupling flanges to be able to connect the pipes with each other. A receiving means for accommodating an insert can be provided in the coupling flanges. The coupling flanges are generally welded to the cylindrical steel pipe.

This configuration has the disadvantage that the area of the welding seam between the coupling flange and the steel pipe may become brittle which negatively influences the strength of the connection. Moreover, the coupling flanges are relatively expensive because they must be processed in a chip-producing manner for being able to meet their optimum function, i.e., an exact seat on the steel pipe and a precise positional orientation of the insert. Further costs are incurred by welding the coupling flange to the steel pipe.

As the cost for manufacturing a coupling flange and for the connection of the flange to the steel pipe increase, the costs of the individual pipe also increases. Additional cost factors are such measures as hardening the inner side of the steel pipe or constructing the steel pipe in two layers. In addition to high initial investment costs, the costs for replacement parts, for example, when a worn pipe has to be exchanged, are also high. Accordingly, there is a great potential for manufacturing such pipes more economically.

SUMMARY OF THE INVENTION

Therefore, starting from the prior art discussed above, it is the object of the present to provide a pipe for conveying solids whose ends which are particularly subjected to wear can be manufactured in a simple and inexpensive manner.

In accordance with the present invention, the coupling flange and the annular portion are formed by a chipless deformation from a tubular steel cylinder.

Accordingly, the gist of the invention is to deform in a chipless manner a tubular steel cylinder at at least one end thereof for forming a chamber for receiving an annular insert, wherein the chamber is formed by a circumferential radial coupling flange and an axially extending annular portion. This configuration results in a number of advantages.

First, apart from the chipless deformation, no additional manufacturing steps are required for manufacturing the coupling flange and the annular portion. Consequently, the pipe can be manufactured in a simple and inexpensive manner.

In addition, the coupling flange and the annular portion are manufactured in one portion from a steel cylinder. Welding seams for connecting the coupling flange to the steel cylinder are not required in the configuration according to the present invention. Consequently, dangers created by welding seams, such as, the induction of peak stresses, the brittleness in the thermal zone of influence, and the resulting strength reduction, are eliminated.

The particular advantage of the invention is the fact that the steel cylinder, the coupling flange and the annular portion are constructed in one piece. This eliminates several manufacturing steps which are required in separately manufactured coupling flanges. The pipe with integrated coupling flange and annular portion can be manufactured very simply and inexpensively by a targeted widening of the end of the steel cylinder.

In accordance with a feature of the invention, the pipe is manufactured of a relatively inexpensive steel having sufficient strength, for example, St52.

Within the scope of the invention, the steel cylinder may be elongated or also curved.

In accordance with an advantageous further development of the concept of the invention, the insert is secured in its position by a chipless deformation of at least sections of the end face of the annular portion. This provides the advantage that an axial displacement of the insert from its intended position is effectively prevented. The chipless deformation of the sections of the annular portion can be effected in the radial and/or axial directions relative to the longitudinal axis of the pipe. A deformation from the axial direction can be produced by a notch at the end face of the annular portion, wherein the displaced material forms radially inwardly directed projections.

In the case of a deformation from the radial direction relative to the longitudinal axis of the pipe, the circumferentially outer end edge of the annular portion is rounded and the material of the annular portion is at least over sections thereof displaced, for example, in the form of locking projections.

For forming the locking projections or a circumferentially extending locking ring, it may be useful to dimension the annular portion with excess material at the end face thereof, wherein the annular portion projects over the insert which rests against the rear wall of the chamber formed by the coupling flange. In the deformed state, the end face of the annular portion and the end face of the insert may coincide.

Of course, it is also within the scope of the present invention to glue the insert into the chamber.

In accordance with another advantageous feature, the insert has a smaller internal diameter than the steel cylinder. Particularly at the end of the pipe on the inlet side thereof, a reduction of the conveying cross-section by the insert results in a displacement of the critical wear zone in the conveying direction and, thus, away from the inlet end of the pipe. This effectively counteracts any premature wear in the vicinity of the coupling flange and a resulting separation of the coupling flange from the pipe.

In accordance with another embodiment, the internal diameters of the insert and of the steel cylinder are equal. The internal diameters of the insert and of the steel cylinder are preferably equal at the outlet end of the pipe. Together with the insert at the inlet end of the adjacent pipe, a wear-resistant transition area can be formed, possibly by creating a wear-resistant step, by inserts with different internal diameters.

The various features of novelty which characterize the invention are pointed out with particularity in the claims annexed to and forming a part of the disclosure. For a better understanding of the invention, its operating advantages, specific objects attained by its use, reference should be had to the drawing and descriptive matter in which there are illustrated and described preferred embodiments of the invention.

DESCRIPTION OF THE PREFERRED EMBODIMENTS

Figure 1:
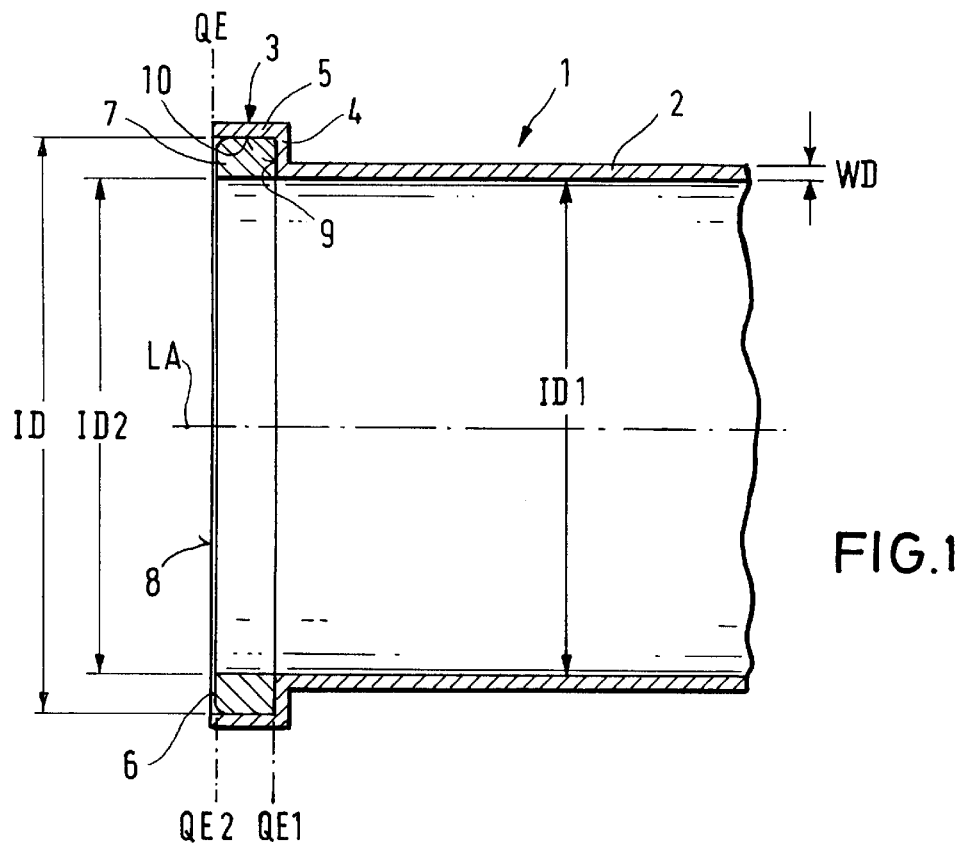
FIG. 1 is a vertical longitudinal sectional view of an end area of a pipe for conveying solids.

FIG. 1 of the drawing shows an end area of a pipe 1 for conveying solids. The pipe 1 is composed of a straight, single-layer steel cylinder 2 having a constant wall thickness WD. The steel cylinder 2 extends between the ends 3 of the pipe 1, wherein the ends 3 are each formed by a circumferentially extending radial coupling flange 4 and an annular portion 5 connected to the coupling flange 4 and extending coaxially with the longitudinal axis LA of the pipe 1. The coupling flange 4 and the annular portion 5 are formed by chipless deformation of a pipe end and form an open chamber 6 which is open towards the end and in which is placed an annular insert 7 having a rectangular cross-section and of a material with a greater resistance to wear as compared to the pipe material.

The chamber 6 extends in the axial direction from a transverse plane QE intersecting the end face 8 of the annular portion 5 to a rear wall 9 of the chamber 6 formed at the coupling flange 4 and extending in a radial transverse plane QE1. The internal diameter ID of the chamber 6 is greater than the internal diameter ID1 of the steel cylinder 2, wherein the inner side 10 of the chamber 6 extends perpendicularly of the transverse plane QE.

The annular insert 7 extends in the axial direction starting from the transverse plane QE1 in the direction towards the end face 8 of the annular portion 5 up to a transverse plane QE2 which extends parallel to the transverse plane QE and is offset by a small distance relative to the end face 8 towards the transverse plane QE1. The insert 7 has an internal diameter ID2 which is equal to the internal diameter ID1 of the steel cylinder 2.

The insert 7 may be pressed into the chamber 6. However, the insert 7 may also be glued into the chamber 6.

Figure 2:
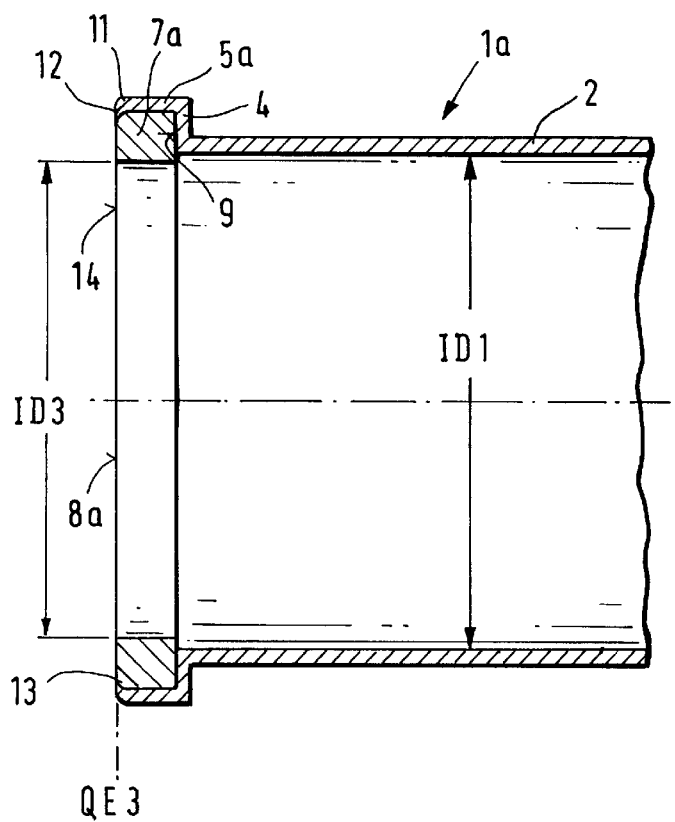
FIG. 2 is a vertical longitudinal sectional view of the end area of another embodiment of a pipe for conveying solids.

FIG. 2 shows another embodiment of a pipe 1a for conveying solids in which an insert 7a is secured in its position by a chipless deformation of a section 11 of the end face of the annular portion 5a. As a result of the chipless deformation of this section 11, a circumferential annular collar 12 extends over the outer end edge 13 of the insert 7a. The annular collar 12 presses the insert 7a against the rear wall 9 of the chamber 6 and secures the insert 7a in this position as a result. The end face 8a of the annular portion 5a extends in a transverse plane QE3 which intersects the end face 14 of the insert 7a.

It is not absolutely required that a circumferential annular collar 12 is provided for securing the insert 7a. Rather, it may be sufficient to provide locking projections distributed over the circumference.

In this embodiment, the internal diameter ID3 of the insert 7a is smaller than the internal diameter ID1 of the steel cylinder 2.

While specific embodiments of the invention have been shown and described in detail to illustrate the inventive principles, it will be understood that the invention may be embodied otherwise without departing from such principles.

I claim:

1. A pipe for conveying solids comprising a tubular steel cylinder having at least at one end thereof a circumferential coupling flange and an axially extending annular portion connected to the coupling flange, and an annular insert of a material having a greater resistance to wear than a pipe material arranged in a chamber formed by the coupling flange and the annular portion, wherein the coupling flange, the annular portion and the tubular steel cylinder are comprised of one piece and the coupling flange and the annular portion are formed by chipless deformation of the tubular steel cylinder.

2. The pipe according to claim 1, wherein at least sections of an end face of the annular portion have chipless deformations for securing the insert in the chamber.

3. The pipe according to claim 1, comprising a glued connection of the insert in the chamber.

4. The pipe according to claim 1, wherein the insert has an internal diameter which is smaller than an internal diameter of the steel cylinder.

5. The pipe according to claim 1, wherein the insert and the steel cylinder have equal internal diameters.

* * * * *